(12) United States Patent
Jaradi et al.

(10) Patent No.: US 11,951,932 B1
(45) Date of Patent: Apr. 9, 2024

(54) LOAD-LIMITING ASSEMBLY FOR SEATBELT

(71) Applicant: Ford Global Technologies, LLC, Dearborn, MI (US)

(72) Inventors: Dean M. Jaradi, Macomb, MI (US); Mohammad Omar Faruque, Ann Arbor, MI (US); S. M. Iskander Farooq, Novi, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 17/935,995

(22) Filed: Sep. 28, 2022

(51) Int. Cl.
*B60R 22/20* (2006.01)

(52) U.S. Cl.
CPC .................. *B60R 22/201* (2013.01)

(58) Field of Classification Search
CPC ....... B60R 22/28; B60R 22/203; B60R 22/20; B60R 22/24; B60R 2022/1818; B60R 22/201; B60R 22/202; B60R 2022/286; B60R 22/195; B60R 22/341
USPC .............................. 280/801.2, 804, 806, 805
See application file for complete search history.

(56) References Cited

U.S. PATENT DOCUMENTS

| | | | |
|---|---|---|---|
| 2,680,476 A | 6/1954 | Saffell | |
| 4,027,905 A | 6/1977 | Shimogawa et al. | |
| 5,234,181 A | 8/1993 | Schroth | |
| 5,265,908 A * | 11/1993 | Verellen | B60R 22/205 297/483 |
| 5,566,978 A | 10/1996 | Fleming et al. | |
| 5,700,034 A * | 12/1997 | Lane, Jr. | B60R 21/01 280/805 |
| 6,099,078 A | 8/2000 | Smithson et al. | |

(Continued)

FOREIGN PATENT DOCUMENTS

| | | |
|---|---|---|
| CN | 108608984 A | 10/2018 |
| CN | 208855587 U | 5/2019 |

(Continued)

OTHER PUBLICATIONS

Non-Final Office Action dated Dec. 8, 2022 re U.S. Appl. No. 17/748,079, filed May 19, 2022.

(Continued)

*Primary Examiner* — Paul N Dickson
*Assistant Examiner* — Caitlin Anne Miller
(74) *Attorney, Agent, or Firm* — Frank A. MacKenzie; Bejin Bieneman PLC

(57) ABSTRACT

An assembly includes a vehicle pillar elongated along an axis. The assembly includes seatbelt retractor and a webbing retractably extendable from the retractor. The seatbelt retractor is lockable from an unlocked position in which the webbing is extendable from and retractable into the retractor to a locked position in which the retractor restricts extension of the webbing from the retractor. A seatbelt guide is supported by the pillar. The seatbelt retractor is below the seatbelt guide. The webbing extends upwardly from the seatbelt retractor around the seatbelt guide. A releasable connection connects the seatbelt guide to the pillar when the seatbelt retractor is in the unlocked position and releases the seatbelt guide relative to the pillar when force on the webbing exceeds a threshold when the seatbelt retractor is in the locked position. An energy absorber is between the vehicle pillar and the seatbelt guide.

20 Claims, 13 Drawing Sheets

(56) References Cited

U.S. PATENT DOCUMENTS

| | | | |
|---|---|---|---|
| 6,129,385 A | 10/2000 | Blackadder | |
| 6,145,881 A * | 11/2000 | Miller, III | B60R 22/20 |
| | | | 280/808 |
| 6,209,916 B1 | 4/2001 | Smithson et al. | |
| 6,336,664 B1 | 1/2002 | Roder | |
| 6,736,427 B2 * | 5/2004 | Herrmann | B60R 22/28 |
| | | | 280/805 |
| 6,913,288 B2 | 7/2005 | Schulz | |
| 6,935,701 B1 | 8/2005 | Arnold et al. | |
| 7,226,120 B2 | 6/2007 | Yamazaki | |
| 7,331,610 B2 | 2/2008 | Herrmann | |
| 8,800,735 B2 * | 8/2014 | Ruthinowski | F16F 1/445 |
| | | | 280/805 |
| 8,820,789 B2 * | 9/2014 | Merrill | B60R 22/26 |
| | | | 297/480 |
| 9,027,964 B2 | 5/2015 | Neero et al. | |
| 9,238,448 B2 | 1/2016 | Wier et al. | |
| 9,499,121 B2 | 11/2016 | Dingman et al. | |
| 9,738,248 B2 * | 8/2017 | Dingman | B60R 22/201 |
| 9,809,193 B2 * | 11/2017 | Marriott | B60R 22/28 |
| 10,953,847 B2 | 3/2021 | Hamilton et al. | |
| 10,981,537 B2 | 4/2021 | Vega et al. | |
| 11,273,790 B2 * | 3/2022 | Hamilton | B60R 21/055 |
| 11,505,159 B2 | 11/2022 | Jaradi et al. | |
| 11,639,153 B2 * | 5/2023 | Farooq | B60R 22/201 |
| | | | 280/805 |
| 2003/0116954 A1 * | 6/2003 | Singer | B60R 22/24 |
| | | | 280/801.1 |
| 2004/0256851 A1 | 12/2004 | Herrmann | |
| 2005/0206215 A1 | 9/2005 | Arnold et al. | |
| 2011/0133439 A1 | 6/2011 | Pearce | |
| 2012/0216524 A1 | 8/2012 | Browne et al. | |
| 2014/0042282 A1 | 2/2014 | Neero et al. | |
| 2017/0267208 A1 | 9/2017 | Marriott et al. | |
| 2018/0222440 A1 | 8/2018 | Grzic et al. | |
| 2020/0238948 A1 | 7/2020 | Williams | |
| 2020/0339063 A1 | 10/2020 | Jaradi et al. | |

FOREIGN PATENT DOCUMENTS

| | | |
|---|---|---|
| FR | 2695603 A1 | 3/1994 |
| GB | 2382802 A | 11/2003 |
| KR | 20020027901 A | 4/2002 |
| KR | 102260808 B1 | 6/2021 |
| WO | 2009082304 A1 | 7/2009 |

OTHER PUBLICATIONS

Non-Final Office Action for U.S. Appl. No. 17/750,627, filed May 23, 2022, as issued by the USPTO dated Feb. 2, 2023.

Non-Final Office Action for U.S. Appl. No. 17/932,683, filed Sep. 16, 2022, as issued by the USPTO dated Nov. 3, 2023.

Final Office Action for U.S. Appl. No. 17/932,683, filed Sep. 16, 2022, as issued by the USPTO dated Dec. 20, 2023.

* cited by examiner

US 11,951,932 B1

LOAD-LIMITING ASSEMBLY FOR SEATBELT

BACKGROUND

A seatbelt in a vehicle may be equipped with "load-limiting" features. During a vehicle impact, a retractor of the seatbelt may lock webbing of the seatbelt from further extension from the retractor, and load-limiting features may permit some additional limited extension of the webbing when the force exerted on the webbing exceeds a load-limiting threshold. This additional extension of the webbing from the retractor limits the load applied by the webbing to the chest of an occupant, which may limit chest compression.

DETAILED DESCRIPTION

Figure 1:
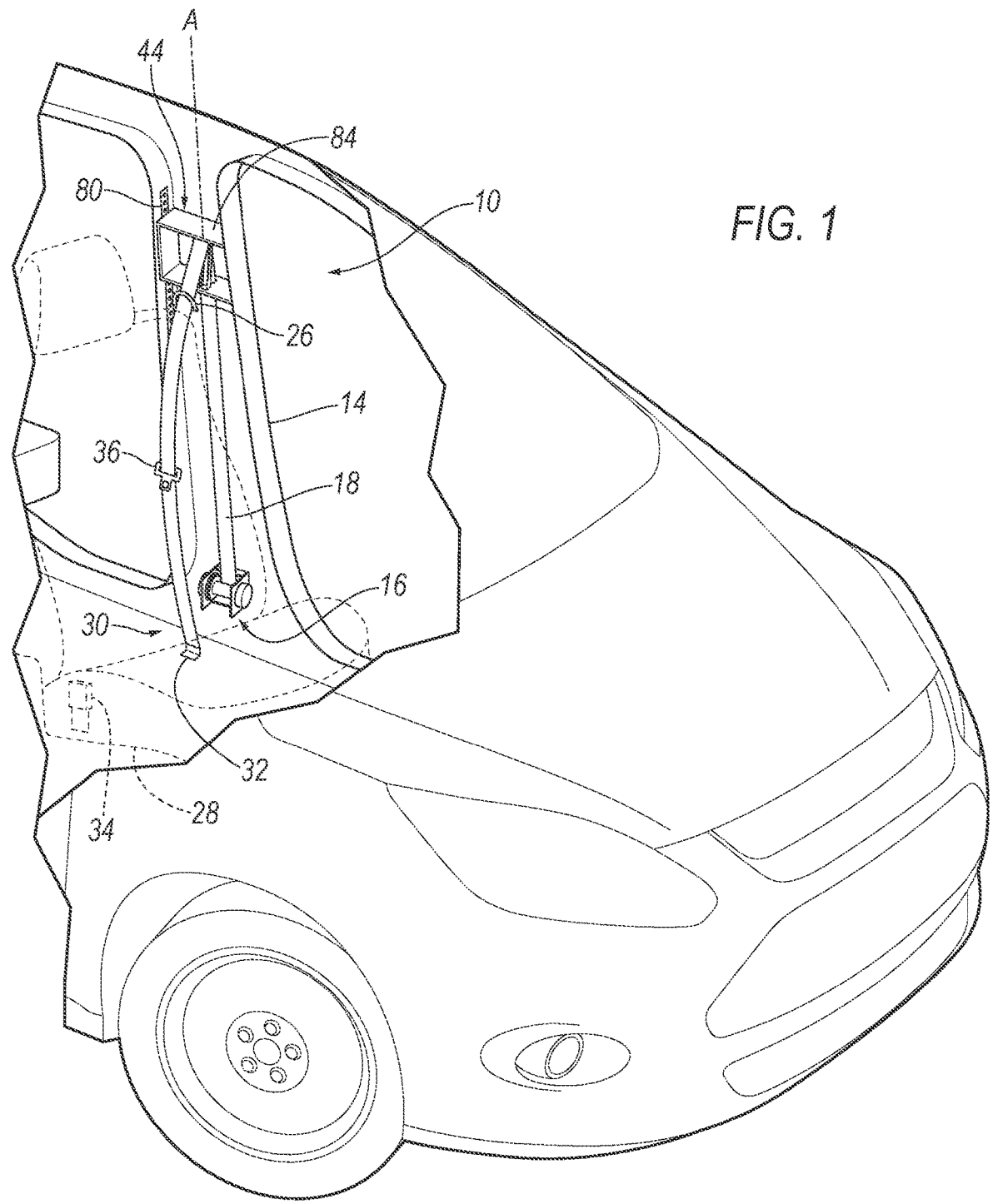
FIG. 1 is a perspective view of a portion of a vehicle with a seatbelt assembly and a load-limiting assembly on a pillar of the vehicle.

With reference to the Figures, wherein like numerals indicate like parts throughout the several views, an assembly (referred to hereinafter as a "load-limiting assembly 10") includes a vehicle pillar 14 elongated along an axis A. The assembly 10 includes a seatbelt retractor 16 and a webbing 18 retractably extendable from the retractor 16. The seatbelt retractor 16 is lockable from an unlocked position in which the webbing 18 is extendable from and retractable into the retractor 16 to a locked position in which the retractor 16 restricts extension of the webbing 18 from the retractor 16. A seatbelt guide 20 is supported by the pillar 14. The seatbelt retractor 16 is below the seatbelt guide 20. The webbing 18 extends upwardly from the seatbelt retractor 16 around the seatbelt guide 20. A releasable connection 24 connects the seatbelt guide 20 to the pillar 14 when the seatbelt retractor 16 is in the unlocked position and releases the seatbelt guide 20 relative to the pillar 14 when force on the webbing 18 exceeds a threshold (hereinafter referred to as the "load-limiting threshold") when the seatbelt retractor 16 is in the locked position. An energy absorber 22 is between the vehicle pillar 14 and the seatbelt guide 20.

During sudden deceleration of the vehicle 12, e.g., during a vehicle impact, an occupant may be urged in the vehicle-forward direction. When the occupant is urged in the vehicle-forward direction, the occupant exerts a force on the webbing 18. In such an instance, the retractor 16 restricts payout of the webbing 18 and the webbing 18 controls the kinematics of the occupant. As a result, the force is exerted by the occupant through the webbing 18 to the seatbelt guide 20. When the force exerted by the occupant is above the load-limiting threshold, the releasable connection 24 releases the seatbelt guide 20 relative to the pillar 14 and the seatbelt guide 20 moves downwardly while compressing the energy absorber 22 between the seatbelt guide 20 and the pillar 14. This movement of the seatbelt guide 20 releases tension on the webbing 18 against the occupant. Specifically, the movement of the seatbelt guide 20 against the bias of the energy absorber 22 limits loads applied by the webbing 18 against the chest of the occupant.

Figure 7:
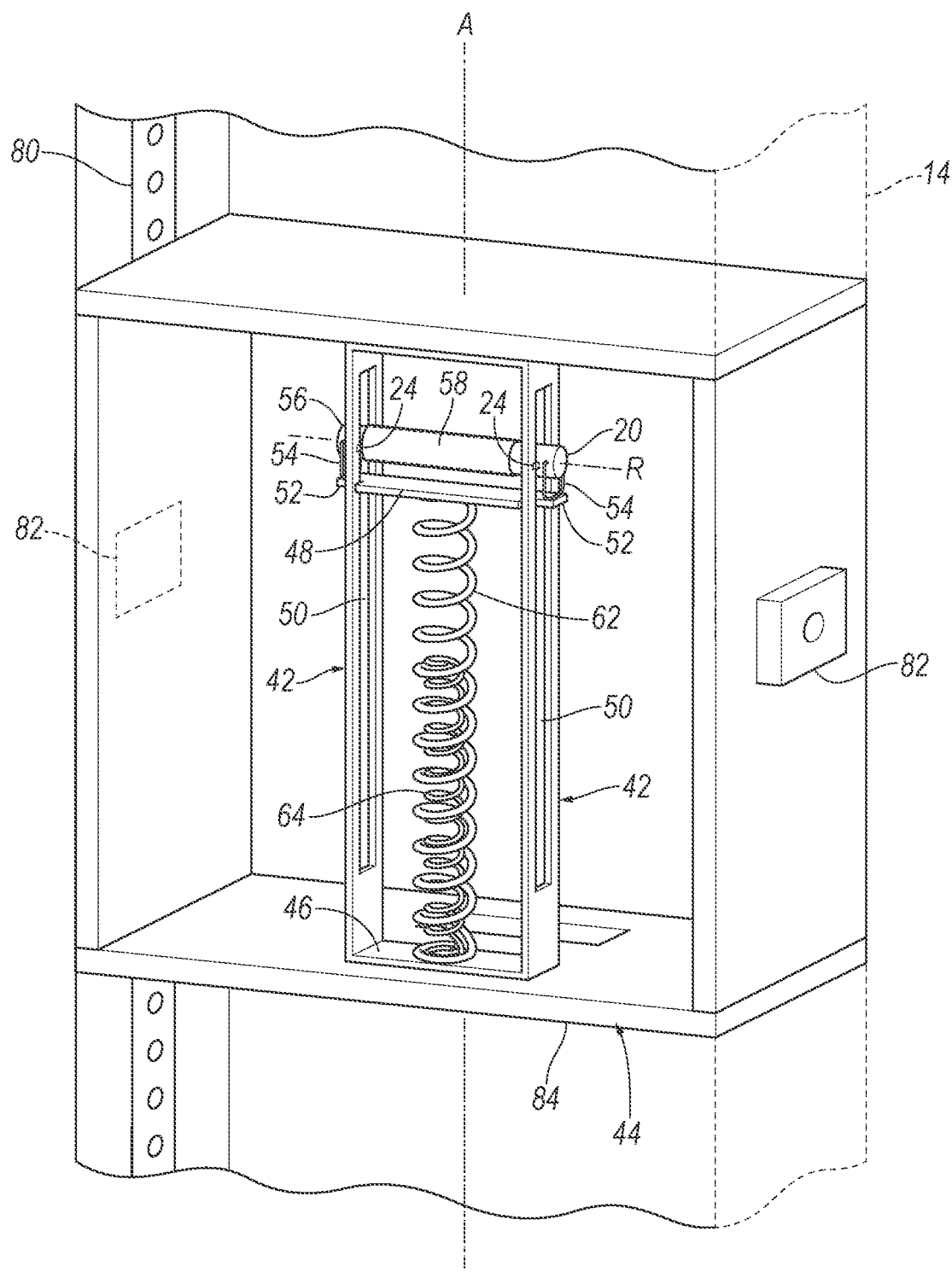
FIG. 7 is another example of the load-limiting assembly including two coil springs.
Figure 8:
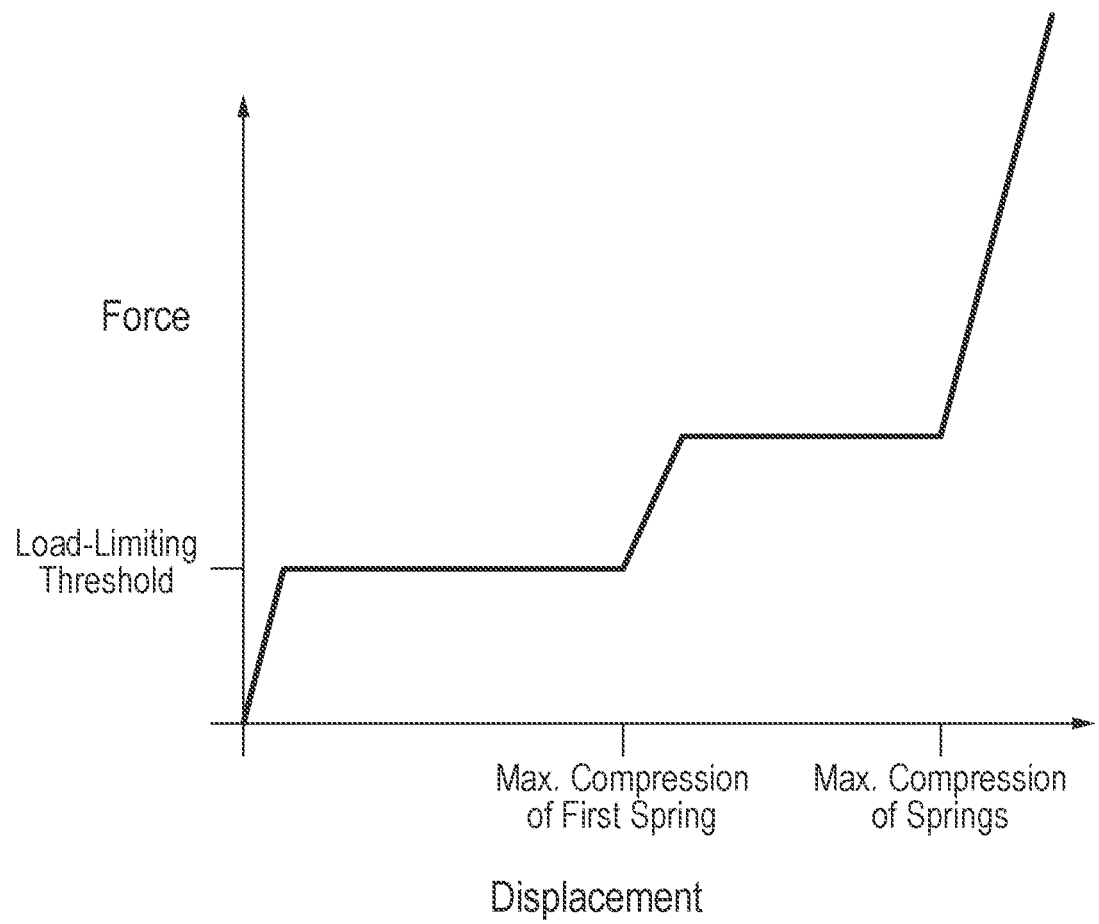
FIG. 8 is a hypothetical graph showing operation of the example of the load-limiting assembly of FIG. 7.
Figure 9:
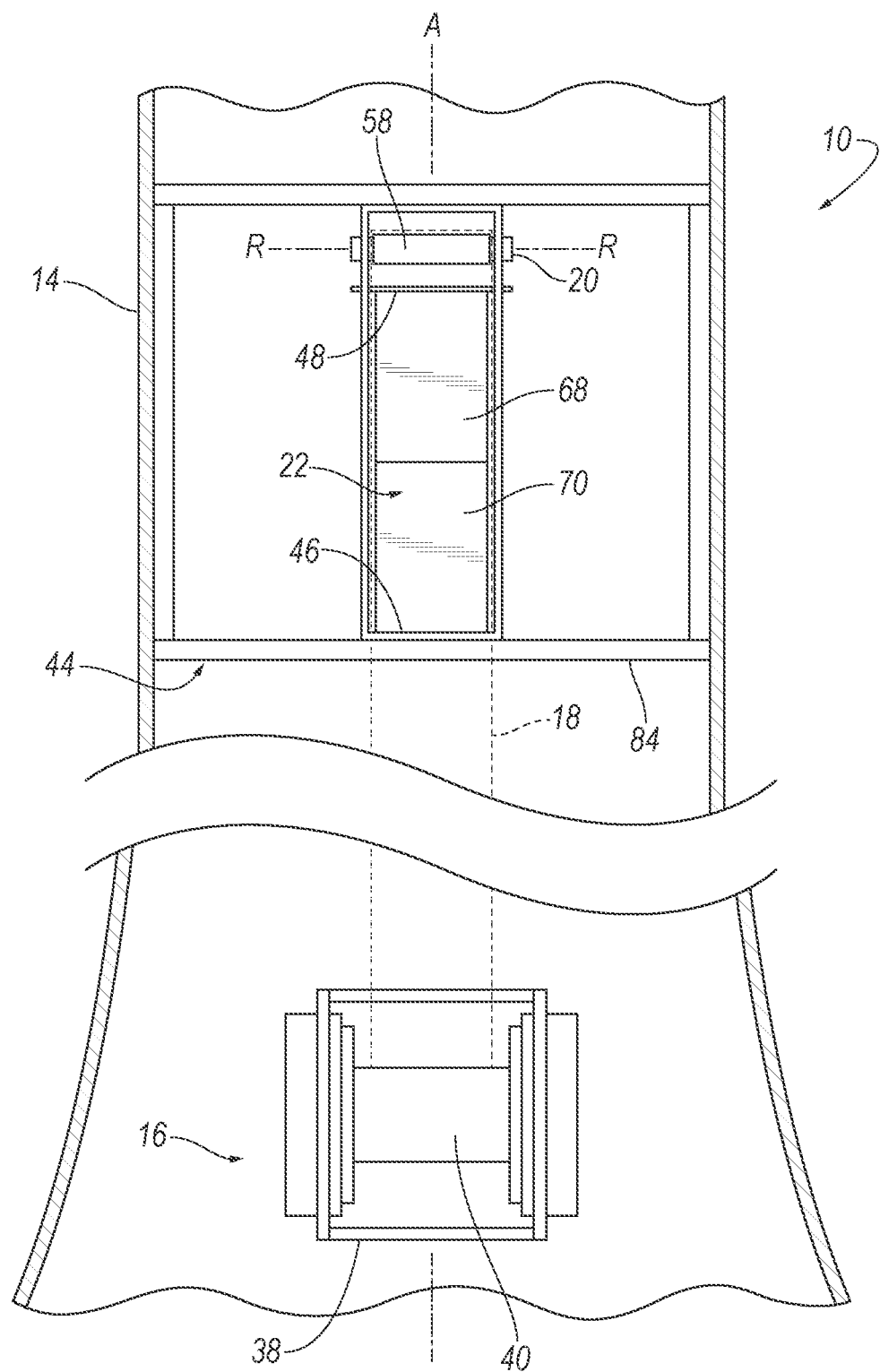
FIG. 9 is a side view of the pillar, another example of the load-limiting assembly including a polymeric block, and a portion of the seatbelt assembly.
Figure 10:
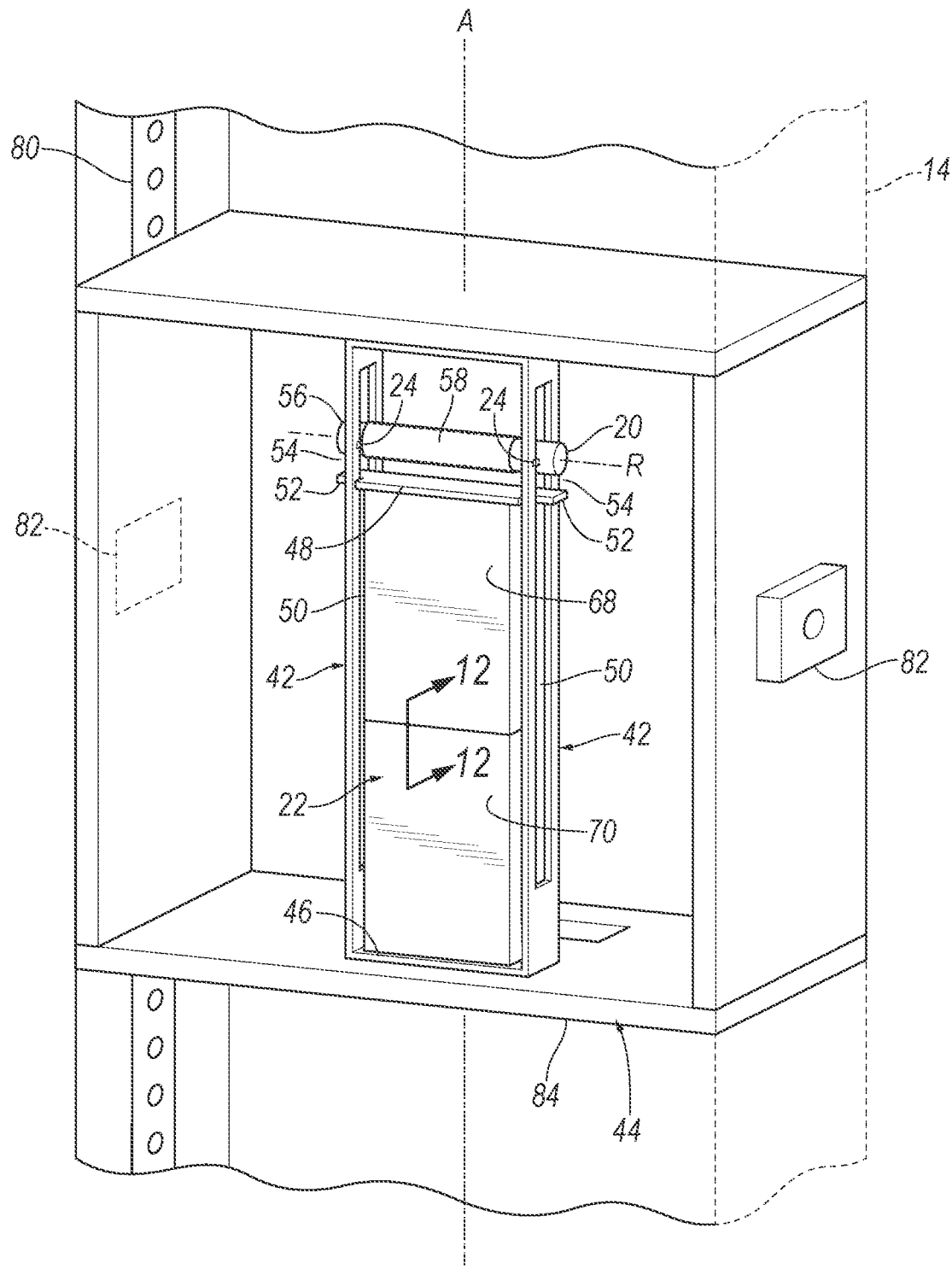
FIG. 10 is a perspective view of a portion of the pillar and the load-limiting assembly of FIG. 9.
Figure 11:
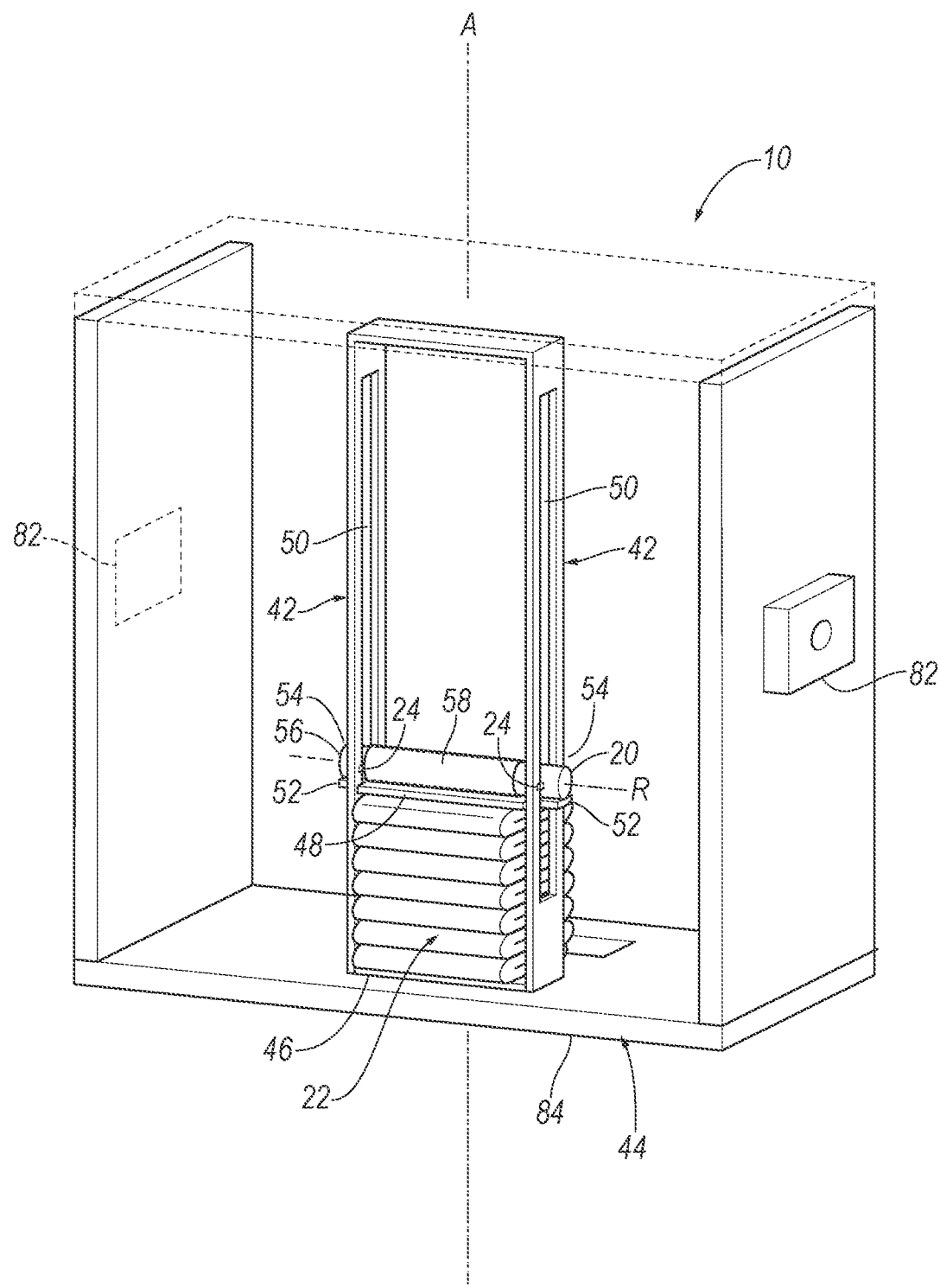
FIG. 11 is a perspective view of the load-limiting assembly of FIG. 9 with the releasable connections released and the seatbelt guide compressing the polymeric block.

One example of the load-limiting assembly 10 is shown in FIGS. 2-6 in which the energy absorber 22 is a coil spring. Another example of the load-limiting assembly 10 is shown in FIGS. 7-8 in which the energy absorber 22 includes a first coil spring 62 and a second coil spring 64. Another example of the load-limiting assembly 10 is shown in FIGS. 9-13 in which the energy absorber 22 includes a polymeric block 66.

The vehicle 12 may be any suitable type of ground vehicle 12, e.g., a passenger or commercial automobile such as a sedan, a coupe, a truck, a sport utility, a crossover, a van, a minivan, a taxi, a bus, etc. The vehicle 12 includes a vehicle frame and a vehicle body. The vehicle body may be of unibody construction, in which the vehicle frame is unitary with the vehicle body including frame rails, rockers, pillars 14, roof rails, etc. As another example, the vehicle body and vehicle frame may have a body-on-frame construction (also referred to as a cab-on-frame construction) in which the vehicle body (including rockers, pillars 14, roof rails, etc.) and vehicle frame are separate components, i.e., are modular, and the vehicle body is supported on and affixed to the vehicle frame. Alternatively, the vehicle frame and vehicle body may have any suitable construction. The vehicle frame and the vehicle body may be of any suitable material, for example, steel, aluminum, and/or fiber-reinforced plastic, etc.

With reference to FIG. 1, the vehicle body includes at least one pillar 14. For example, the vehicle body may include an A-pillar and a B-pillar on each side of the vehicle 12. The pillars 14 are elongated along the axis A. The axis A is upright. The axis A may be generally vertical. The vehicle body may include a roof and a floor of the vehicle 12. The roof and the floor are spaced from each other along the axis A. The pillars 14 extend upwardly from the floor to the roof. The vehicle 12 may include a D-ring 26 on the pillar 14 and/or trim on the pillar 14 to guide the webbing 18 (FIG. 1).

The vehicle frame and/or the vehicle body defines a passenger compartment to house occupants of the vehicle 12. The passenger compartment may extend across the vehicle 12, i.e., from one side to the other side of the vehicle 12. The passenger compartment includes one or more seats 28. The seats 28 may be arranged in any suitable manner in the passenger compartment. The seats 28 may be of any suitable type, e.g., a bucket seat as shown in the Figures.

The vehicle 12 includes a seatbelt assembly 30. In the example shown in FIG. 1, one seatbelt assembly 30 is shown in the B-pillar for use by an occupant of the seat 28 adjacent the B-pillar. The vehicle 12 may include any suitable number of seatbelt assemblies and corresponding load-limiting assemblies 10 at any suitable location in the passenger compartment.

With continued reference to FIG. 1, the seatbelt assembly 30 includes the seatbelt retractor 16 and the webbing 18 retractably extendable from the retractor 16. The seatbelt assembly 30 may include an anchor 32 fixed to the webbing 18 and the vehicle body, e.g., the floor. The seatbelt assembly 30 may include a buckle 34 fixed to the vehicle body, e.g., the floor, and a clip 36 that releasably engages a buckle 34. The webbing 18 may extend continuously from the seatbelt retractor 16 to the anchor 32. For example, one end of the webbing 18 feeds into the seatbelt retractor 16, and the other end of the webbing 18 is fixed to the anchor 32. When the buckle 34 is engaged with the clip 36, the webbing 18 controls the kinematics of the occupant of the seat 28 during sudden deceleration, e.g., during vehicle impact.

The webbing 18 may be fabric, e.g., polyester. The clip 36 slides freely along the webbing 18 and, when engaged with the buckle 34, divides the webbing 18 into a lap band and a shoulder band in the example shown in the figures. Specifically, the seatbelt assembly 30 may be a three-point harness, meaning that the webbing 18 is attached at three points around the occupant when fastened: the anchor 32, the seatbelt retractor 16, and the clip 36. The seatbelt assembly 30 may, alternatively, include another arrangement of attachment points.

The seatbelt retractor 16 is below the seatbelt guide 20. The seatbelt retractor 16 may be supported at any suitable location in the vehicle 12 below the seatbelt guide 20. For example, the seatbelt retractor 16 may be supported by and fixed to the pillar 14, e.g., with fasteners. Since the retractor 16 is below the seatbelt guide 20, the webbing 18 extends upwardly from the retractor 16 and around the seatbelt guide 20.

The seatbelt retractor 16 includes a housing 38 and a spool 40 rotatably supported by the housing 38. The seatbelt webbing 18 is coiled about the spool 40. The spool 40 is selectively rotatable relative to the housing 38 to pay out and retract the seatbelt webbing 18 relative to the spool 40. The spool 40 may be spring-loaded relative to the housing 38, e.g., with an energy absorber 22 between the spool 40 and the housing 38, to automatically retract slack from the seatbelt webbing 18.

The seatbelt retractor 16 is lockable from an unlocked position in which the webbing 18 is extendable from and retractable into the retractor 16 to a locked position in which the retractor 16 restricts extension of the webbing 18 from the retractor 16. In the locked position, the retractor 16 may prevent extension of the webbing 18 from the retractor 16. The seatbelt retractor 16, in some examples, may be moveable from an unlocked position to a locked position by conventional mechanisms known in the art. The seatbelt retractor 16 may be in the unlocked position by default, i.e., in the absence of a sudden deceleration. The seatbelt retractor 16 may change from the unlocked position to the locked position during a sudden deceleration of the vehicle 12, i.e., deceleration triggers components of the seatbelt retractor 16 to change from the unlocked position to the locked position.

The seatbelt assembly 30 may include a locking device engageable with the spool 40 to restrict payout of the webbing 18 from the seatbelt retractor 16. In the unlocked position, the locking device allows payout of the webbing 18 from to the seatbelt retractor 16 and, in the locked position, the locking device restricts payout of the webbing 18 from the seatbelt retractor 16, e.g., prevents payout. The locking device may be any suitable locking device including those known in the art, e.g., weighted pendulum/pawl, centrifugal clutch, etc. With the spool 40 in the unlocked position, the seatbelt webbing 18 may be extended from and retracted into the seatbelt retractor 16. In other words, the seatbelt webbing 18 may be coiled and uncoiled freely about the spool 40. With the spool 40 in the locked position, the seatbelt retractor 16 controls extension of the seatbelt webbing 18 to control the kinematics of the occupant. Specifically, the spool 40 is locked relative to the housing 38. In some examples, the seatbelt retractor 16 may include a torsion bar including known structures in some examples, that allows for a limited amount of payout of the seatbelt webbing 18 and, in some examples, the seatbelt retractor 16 does not include a torsion bar and may prevent payout in the locked position as the load-limiting assembly 10 eliminates the need for a torsion bar. The spool 40 may be in the unlocked position by default, i.e., in the absence of a sudden deceleration. The spool 40 may change from the unlocked position to the locked position during a sudden deceleration of the vehicle 12. Specifically, the locking device may engage the spool 40 in response to deceleration of the vehicle 12, e.g., a sudden slowing of the vehicle 12, sudden stop, vehicle impact, etc. In other words, the locking device may be moved from the unlocked position to the locked position by vehicle deceleration. The locking device may engage the spool 40 in response to an activation sensor. The activation sensor senses sudden deceleration of the vehicle 12 and triggers activation of the locking device, i.e., moves the locking device to the locked position. As one example, the activation sensor may be in the seatbelt retractor 16 and may be, for example, a weighted pendulum, a centrifugal clutch, or any other suitable type.

The seatbelt buckle 34 releasably engages the clip 36, and specifically a latch plate of the clip 36. The seatbelt buckle 34 may include, for example, a slot, a latch, a release button, and/or any other suitable structure. The release button may be spring-loaded, as is known. The latch plate may be engaged with the seatbelt buckle 34 upon insertion into the slot. For example, the clip 36 may engage an opening defined by the latch plate and inhibit removal of the latch plate from the slot. Actuation of the release button may disengage the latch plate from the seatbelt buckle 34. For example, depression of the release button may disengage the seatbelt buckle 34 from the opening defined by the latch plate and permit removal of the latch plate from the slot.

The load-limiting assembly 10 limits the load applied by the webbing 18 to the occupant. During a vehicle impact, as described above, the retractor 16 may prevent or limit the extension of the webbing 18 of the seatbelt assembly 30 from the retractor 16. The load-limiting assembly 10 allows for a predetermined, limited amount of release of the webbing 18 relative to the occupant when the force exerted on the webbing 18 by the occupant exceeds the load-limiting threshold. This limited release of the webbing 18 limits the load applied by the webbing 18 to the chest of an occupant, which may limit chest compression. The operation of the load-limiting assembly 10 is dependent upon the size of the occupant, e.g., the weight of the occupant. In other words, at a given speed of the vehicle impact, a large occupant may exert a load on the webbing 18 exceeding the load-limiting threshold whereas, at that same speed, the load exerted on the webbing 18 by a small occupant may not exceed the load-limiting threshold.

The load-limiting assembly 10 includes the seatbelt guide 20, the frame 44, and the spring 22. The frame 44 includes a track 42 supporting the seatbelt guide 20 on the pillar 14. The track 42 includes a slot 50. The load-limiting assembly 10 may include a housing 84 and in such examples the frame 44 may be fixed to the housing 84 and/or parts of the frame 44 may be unitary with the housing 84, i.e., a single, uniform piece of material with no seams, joints, fasteners, or adhesives holding them together. In such examples, parts of the frame 44 and housing are formed together simultaneously as a single continuous unit, e.g., by machining from a unitary blank, molding, forging, casting, etc. Non-unitary components, in contrast, are formed separately and subsequently assembled, e.g., by threaded engagement, welding, etc.

The load-limiting assembly 10 includes the seatbelt guide 20, a track 42 supporting the seatbelt guide 20 on the pillar 14, and the energy absorber 22. The webbing 18 of the seatbelt assembly 30 extends upwardly from the seatbelt retractor 16, over the seatbelt guide 20, and downwardly to the anchor 32 that connects the webbing 18 to the vehicle body. The clip 36 of the seatbelt assembly 30 is between the seatbelt guide 20 and the anchor 32. During operation, the webbing 18 slides and/or rolls across the seatbelt guide 20 as webbing 18 is extended from and retracted into the seatbelt retractor 16. During sudden deceleration of the vehicle 12, the seatbelt retractor 16 is triggered to the locked position, as described above, and the force of the occupant is exerted on the seatbelt guide 20 by the webbing 18. In the event the force on the seatbelt guide 20 exceeds the load-limiting threshold, the releasable connection 24 releases the seatbelt guide 20 and the seatbelt guide 20 moves downwardly while compressing the energy absorber 22 to limit force of the webbing 18 across the occupant.

The load-limiting assembly 10 is supported by the pillar 14, i.e., the weight of the load-limiting assembly 10 is borne by the pillar 14. The load-limiting assembly 10 is fixed to the pillar 14, e.g., with an adjustment track 80, fastener, welding, adhesive, etc. As an example, the load-limiting assembly 10 may include a frame 44 that supports the energy absorber 22 and the seatbelt guide 20 and the frame 44 may be supported by and fixed to the pillar 14. In such an example, the frame 44 may include a lower plate 46, an upper plate 48 above the lower plate 46, and a pair of tracks 42 spaced from each other and extending along the axis A between the lower plate 46 and the upper plate 48. The lower plate 46 and/or the tracks 42 may be fixed to the pillar 14 directly or indirectly, for example, as described above, connected by the adjustment track 80, fastener, welding, adhesive, etc. The tracks 42 may extend from the lower plate 46 to the upper plate 48, as in the example shown in the figures.

The load-limiting assembly 10 may be adjustable upwardly and downwardly relative to the pillar 14, i.e., along the axis A, between a plurality of fixed positions. Specifically, the load-limiting assembly 10 may be adjustable between the fixed positions by an occupant. When adjusted to a fixed position, the frame 44 is locked to the pillar 14 and the seatbelt guide 20 is fixed to the frame 44 by the releasable connection 24. Specifically, the pillar 14 may include the adjustment track 80 that guides the frame 44 to the various positions and the frame 44 is locked to the adjustment track 80 in any one of the fixed positions. The occupant may lock and unlock the frame 44 in the fixed position with a locking mechanism 82 such as, for example, spring-loaded pins, solenoids, etc. The adjustment track 80 and the locking mechanism 82 and/or housing 84 may include corresponding channels and sliders along the axis A (e.g., dove-tail channels, T-shaped channels, etc., and corresponding sliders) to guide relative movement of the load-limiting assembly 10 along the axis A. In the example shown in the figures, the adjustment track 80 includes holes and the locking mechanism 82 includes a pin retractably extendable into any of the holes based on position of the frame 44 along the pillar 14. Specifically, the occupant may operate the locking mechanism 82 by manual operation (through a push-button, lever, etc.) or electronic operation (through a switch, human-machine interface, etc.) to lock and unlock the frame 44 relative to the pillar 14. In such an example, the occupant initially sets the position of the load-limiting assembly 10 relative to the pillar 14 and leaves the load-limiting assembly 10 in that position during operation of the vehicle 12. When locked in one of the fixed positions, the frame 44 of the load-limiting assembly 10 is immovable relative to the pillar 14 absent unlocking by the occupant by operation of the locking mechanism 82. As another example, the frame 44 may be fixed in one immoveable position relative to the pillar 14, e.g., by welding, fasteners, adhesive, etc.

In the example shown in the figures, the load-limiting assembly10 includes the housing 84 that supports the track 42 on the pillar 14 and the housing 84 is selectively moveable relative to the pillar 14. The housing 84 may be a component of the frame 44 of the load-limiting assembly 10. Specifically, the lower plate 46 and/or the tracks 42 may be fixed relative to the housing 84, e.g., by direct connection with, for example, fasteners, welding, adhesive, etc., or may be unitary with the housing 84. The lower plate 46 and/or the tracks 42 moves as a unit with the housing 84 relative to the pillar 14. The locking mechanism 82 may be fixed to the housing 84, as shown in the example in the figures. The housing 84 may include a lower wall, an upper wall, and two side walls, as shown in the example shown in the figures. The load-limiting assembly 10 may include two locking mechanisms 82, each on a respective side wall of the housing 84 and, in such an example, two adjustment tracks 80 may be on the opposing sides of the pillar 14, respectively.

Figure 2:
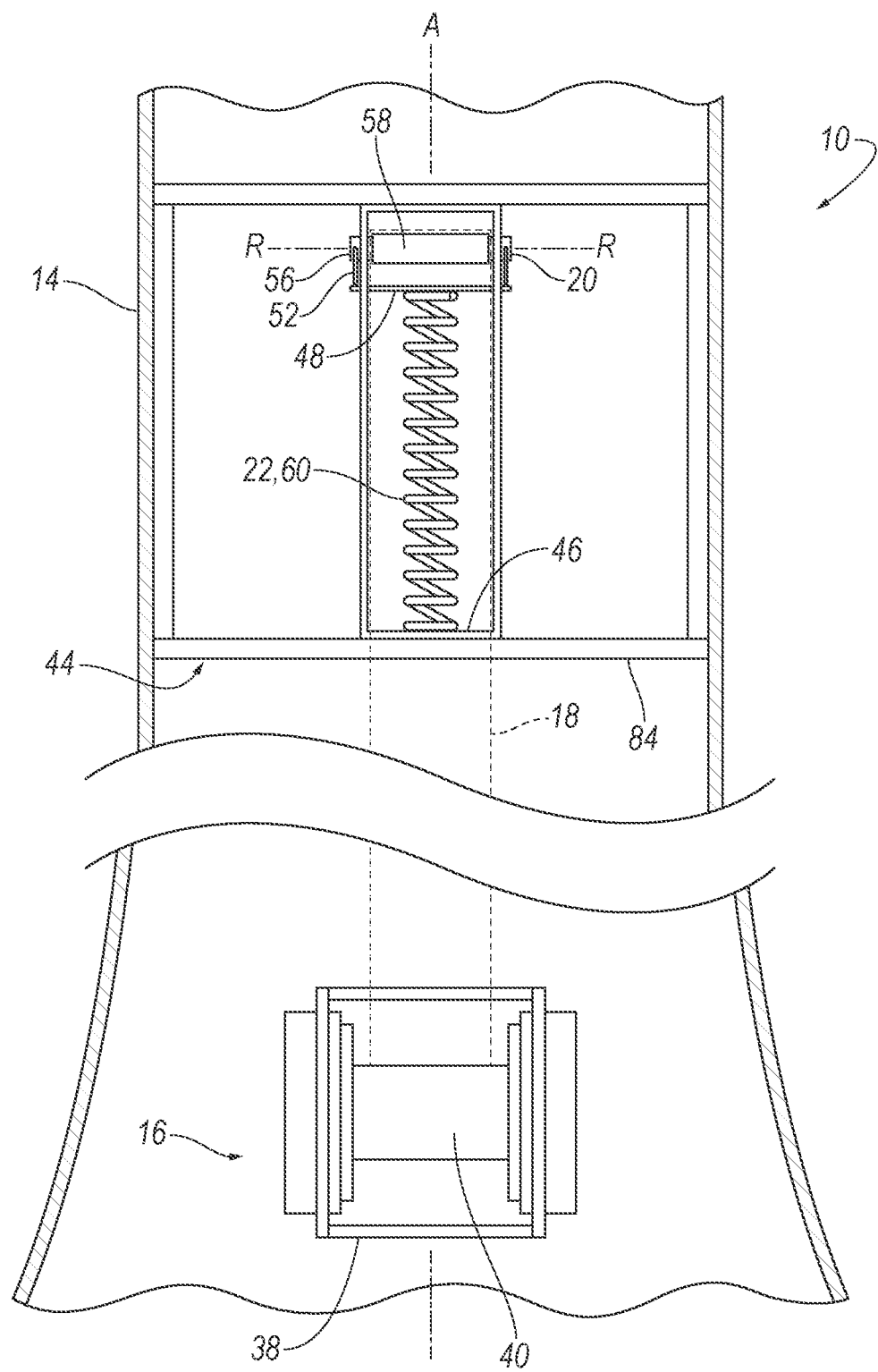
FIG. 2 is a side view of the pillar, one example of the load-limiting assembly, and a portion of the seatbelt assembly.
Figure 3:
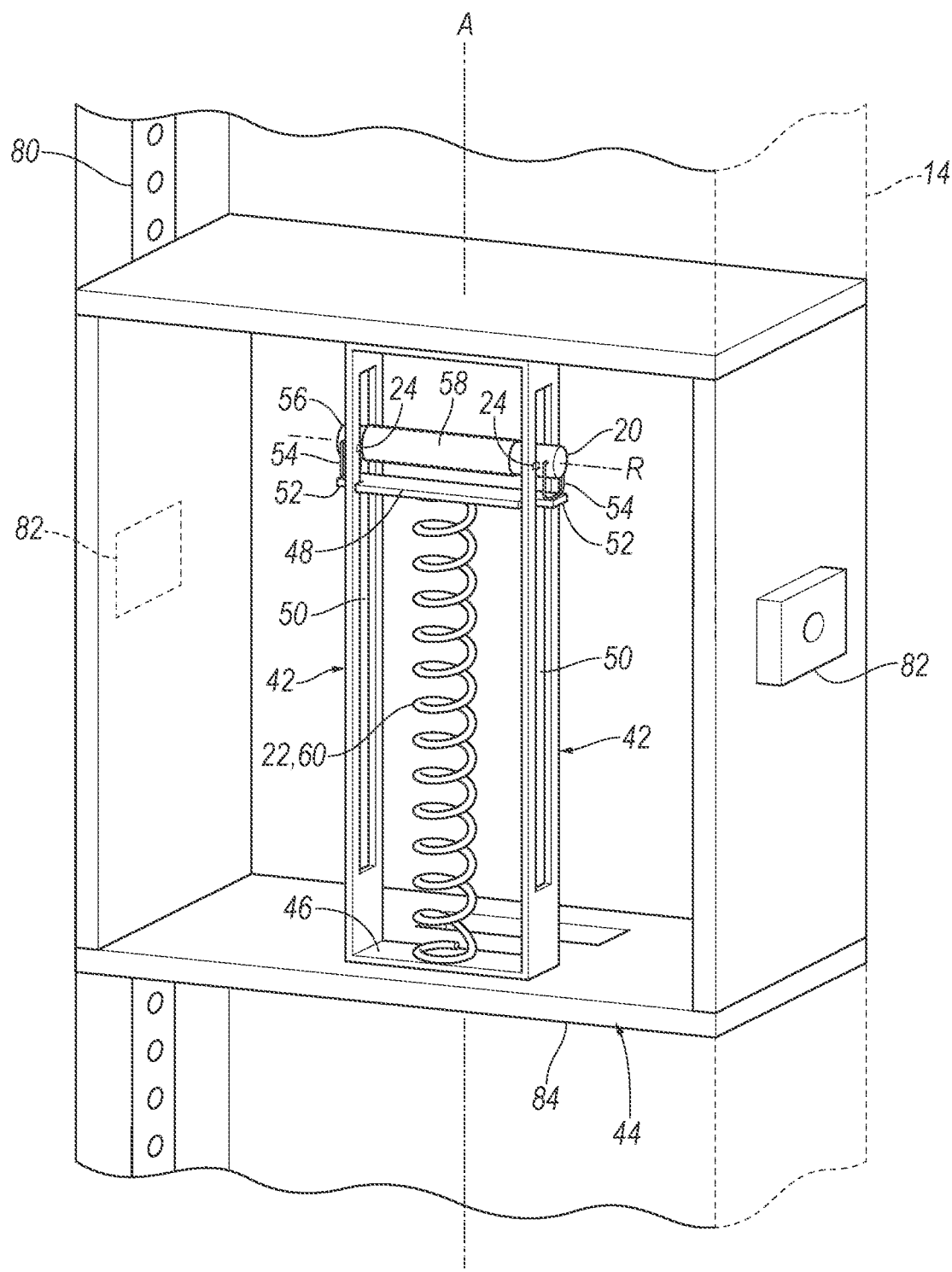
FIG. 3 is a perspective view of a portion of the pillar and the load-limiting assembly of FIG. 2.

With reference to FIGS. 2 and 3, the lower plate 46 and the upper plate 48 are spaced from each other along the axis A. The lower plate 46 is below the energy absorber 22, the upper plate 48, and the seatbelt guide 20. The retractor 16 may be below the lower plate 46 such that the webbing 18 extends upwardly from the retractor 16, past the lower plate 46, to the seatbelt guide 20. The lower plate 46 and the upper plate 48 are in planes transverse to the axis A. For example, the axis A may be normal to the lower plate 46 and the upper plate 48. The tracks 42, the lower plate 46, and the upper plate 48 may be of any suitable material, e.g., steel, aluminum, fiber reinforced composite, etc.

As set forth above, the track 42 of the frame 44 is elongated along the axis A. The track 42 guides movement of the seatbelt guide 20 when the releasable connection 24 releases and the seatbelt guide 20 moves against the bias of the energy absorber 22. Specifically, the track 42 guides movement of the seatbelt guide 20 along the axis A.

Figure 5:
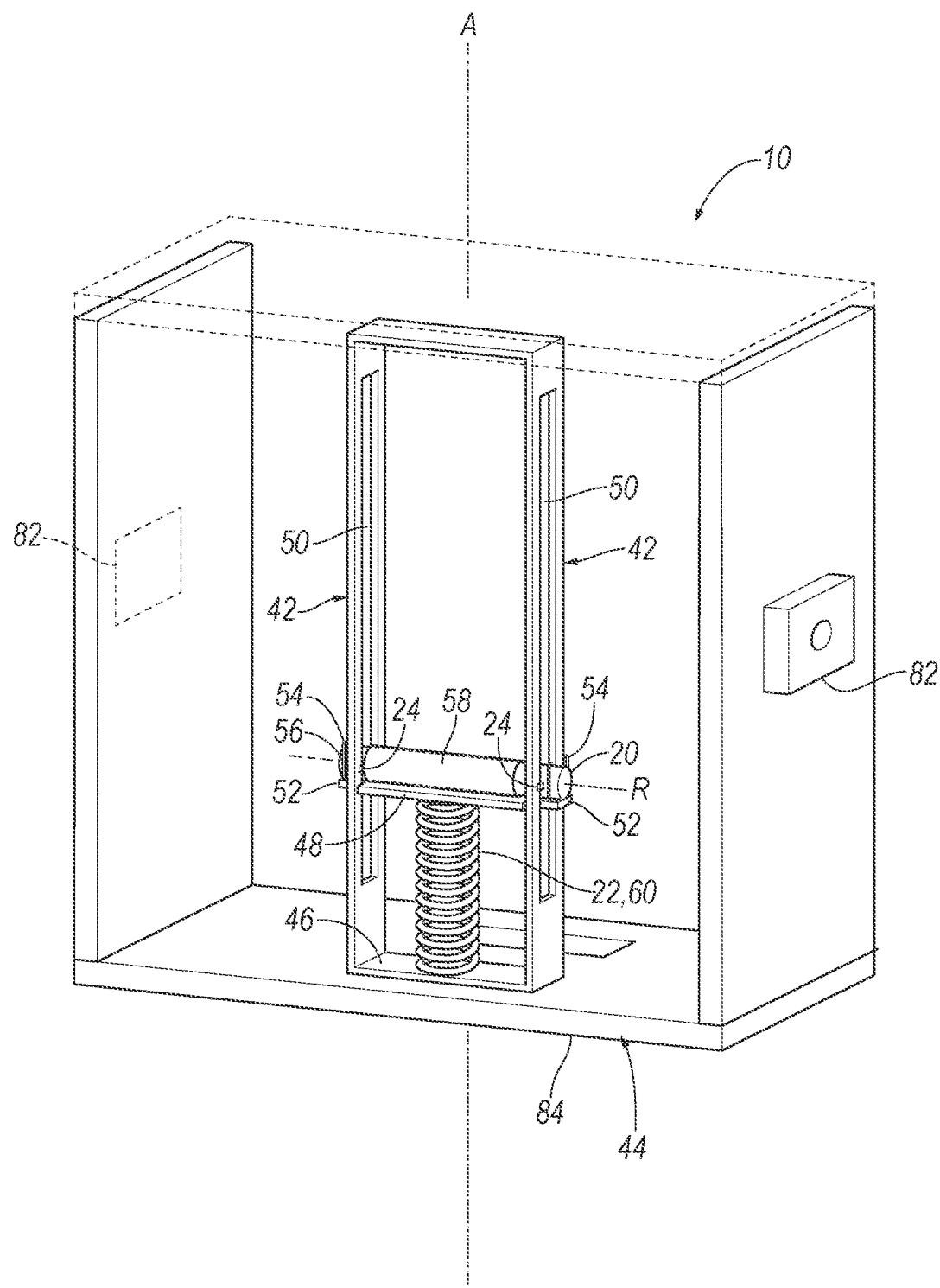
FIG. 5 is a perspective view of the load-limiting assembly of FIG. 2 with the releasable connections released and the seatbelt guide compressing the spring.

In the example shown in the figures, the load-limiting assembly 10 includes two tracks 42. The tracks 42 may be spaced from each other along the vehicle-longitudinal axis of the vehicle 12. The pair of tracks 42 are oriented such that the seatbelt guide 20 is moveable along the axis A in the tracks 42. For example, in the example shown in the figures, the track 42 includes the slot 50 elongated along the axis A. The seatbelt guide 20 is moveably engaged with the slot 50, i.e., the seatbelt guide 20 moves along the slot 50 and the slot 50 restricts movement of the seatbelt guide 20 along the axis A when the releasable connection 24 is released. In the example shown in the figures, ends of the seatbelt guide 20, e.g., a rod 56 of the seatbelt guide 20) extend through the slots 50 and slide along the slots 50 as the seatbelt guide 20 moves relative to the track 42. The ends of the rod 56 may be retained in the slots 50 before and during initial release of the releasable connection 24 through the full compression of the energy absorber 22, as shown in FIG. 5.

Figure 4:
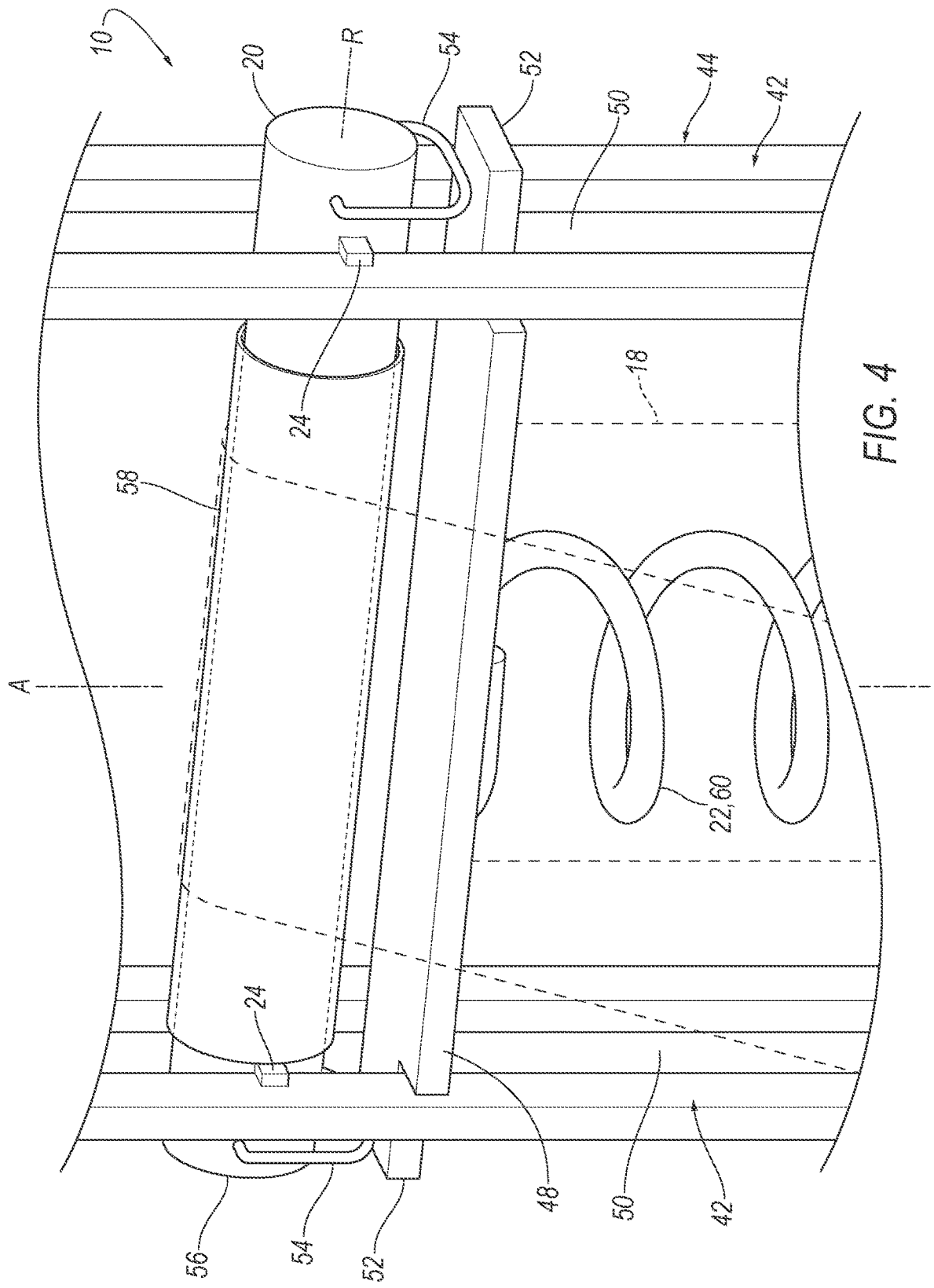
FIG. 4 is a magnified view of a portion of the load-limiting assembly of FIG. 2 including tracks, a seatbelt guide fixed relative to the tracks with releasable connections, and a coil spring below the seatbelt guide.

With reference to FIGS. 2-4, the upper plate 48 is supported by the pillar 14 between the seatbelt guide 20 and the energy absorber 22. Specifically, the upper plate 48 is supported by the frame 44 between the seatbelt guide 20 and the energy absorber 22. In the example shown in the figures, the lower plate 46 is supported by a lower wall of the housing 84 and the tracks 42 are connected to side walls of the housing 84.

At least a portion of the track 42 is disposed between the upper plate 48 and the lower plate 46. The upper plate 48 is moveably engaged with the track 42. For example, in the example shown in the figures, upper plate 48 is moveably engaged with the slot 50, i.e., the upper plate 48 moves along the slot 50 and the slot 50 restricts movement of the upper plate 48 along the axis A when the releasable connection 24 is released and the seatbelt guide 20 contacts the upper plate 48. In the example shown in the figures, wings 52 of the upper plate 48 extend through the slots 50 and slide along the slots 50 as the seatbelt guide 20 moves the upper plate 48 relative to the track 42. The wings 52 may be retained in the slots 50 before and during initial release of the releasable connection 24 through the full compression of the energy absorber 22, as shown in FIG. 5.

The upper plate 48 may be spaced from the seatbelt guide 20 when the releasable connection 24 is intact, i.e., connecting the seatbelt guide 20 to the tracks 42. The load-limiting assembly 10 may include at least one riser 54 (two risers 54 in the examples shown in FIGS. 2-8) between the upper plate 48 and the seatbelt guide 20. In such an example, the riser 54 may retain the upper plate 48 in contact with the energy absorber 22. Upon release of the releasable connection 24, the riser 54 may transmit force from the seatbelt guide 20 to the upper plate 48 and/or the riser 54 may break or deform to allow the seatbelt guide 20 to contact the upper plate 48 and transmit force to the upper plate 48. In the example shown in FIGS. 9-12, the load-limiting assembly 10 does not include risers and the upper plate 48 rests on the polymeric block 66 and the releasable connections 24 space the seatbelt guide 20 from the upper plate 48.

With reference to FIGS. 1-3, the seatbelt guide 20 is supported by the pillar 14. In other words, the weight of the seatbelt guide 20 is borne by the pillar 14. In the example shown in the figures, the seatbelt guide 20 is indirectly supported by the pillar 14. Specifically, the seatbelt guide 20 is supported by the frame 44 and the frame 44 is supported by the pillar 14 (specifically, the housing 84 is supported by the pillar 14). In the example shown in the figures, the seatbelt guide 20 is supported by and connected directly to the tracks 42 by the releasable connection 24.

With reference to FIGS. 2-5, the rod 56 may extend from one track 42 to the other track 42. The rod 56 is fixed to the at least one track 42 with the releasable connection 24. In the example shown in the figures, the rod 56 is connected to each track 42 with two releasable connections 24 (i.e., four total releasable connections 24).

With reference to FIGS. 1 and 4, the webbing 18 is supported by the rod 56 and the releasable connection 24 connects the rod 56 to the pillar 14. The webbing 18 is supported by the sleeve 58 and the releasable connection 24 connects the rod 56 to the pillar 14.

The seatbelt guide 20 includes the rod 56, as introduced above, and may include a sleeve 58 rotatably supported on the rod 56. The rod 56 is elongated along a rod axis R. The rod axis R extends along the vehicle-longitudinal axis and, in some examples, may be generally parallel to the vehicle-longitudinal axis. As shown in the figures, the webbing 18 turns around the rod 56 about the rod axis R, i.e., extends upwardly from the retractor 16 to the seatbelt guide 20 and turns around the rod axis R and extends downwardly toward the anchor 32. The rod 56 may cylindrical, as shown in the figures. The rod 56 may be of any suitable material, e.g., steel, aluminum, plastic, composite, etc. In examples not including the sleeve 58, the webbing 18 slides directly on the rod 56 as the webbing 18 extends from and retracts into the retractor 16 and during movement of the seatbelt guide 20 after release of the releasable connection 24. In such examples, the rod 56 may be of a material or may include a coating that reduces friction with the webbing 18 as the webbing 18 moves relative to the rod 56.

In some examples, the seatbelt guide 20 may include the sleeve 58, as shown in the example in FIGS. 4 and 5. In such examples, the sleeve 58 extends endlessly around the rod 56 about the rod axis R. The sleeve 58 may be elongated along the rod axis R. The sleeve 58 is rotatably supported on the rod 56 and freely rotates about the rod axis R. The sleeve 58 and the rod 56 are designed for the sleeve 58 to rotate freely relative to the rod 56. For example, the sleeve 58 and the rod 56 are sized and shaped for the sleeve 58 to rotate about the rod 56. The rod 56 may be cylindrical, as set forth above, and the sleeve 58 may be an annular cylinder that annularly extends round rod 56. The rod 56 and/or the sleeve 58 may include friction-inhibiting material or coatings between the rod 56 and the sleeve 58 to encourage free rotation therebetween. The seatbelt guide 20 may include bearings between the sleeve 58 and the rod 56. As the webbing 18 is extended from and retracted into the retractor 16, the webbing 18 moves over the seatbelt guide 20 and the sleeve 58 rotates on the rod 56. The sleeve 58 may be of any suitable material, e.g., steel, aluminum, plastic, composite, etc. The sleeve 58 may be of the same or different material as the rod 56.

With reference to FIGS. 4 and 5, the seatbelt guide 20 is moveable relative to the pillar 14 along the axis A. Specifically, releasable connection 24 releases the seatbelt guide 20 from the tracks 42 and the seatbelt guide 20 moves downwardly along the track 42 against the bias of the energy absorber 22 when the force of the seatbelt guide 20 exceeds the load-limiting threshold. The seatbelt guide 20 moves relative to the pillar 14 along the axis A against the bias of the energy absorber 22. As an example, the seatbelt guide 20 may move relative to the pillar 14 in parallel with the axis A against the bias of the energy absorber 22.

With reference to FIGS. 3 and 4, the load-limiting assembly 10 includes at least one releasable connection 24 between the seatbelt guide 20 and the pillar 14. In the example shown in the figures, releasable connections 24 directly connect the seatbelt guide 20 to the tracks 42, indirectly connecting the seatbelt guide 20 to the pillar 14 and fixing the seatbelt guide 20 relative to the pillar 14, as described further below. Specifically, in the example shown in the figures, the rod 56 is connected to each track 42 with two releasable connections 24 (i.e., four total releasable connections 24).

The releasable connection 24 fixes the seatbelt guide 20 relative to the pillar 14 and the frame 44 when subjected to forces below the load-limiting threshold and releases the seatbelt guide 20 from the pillar 14 and the frame 44 when subjected to forces above the load-limiting threshold to allow the seatbelt guide 20 to move toward the energy absorber 22 against the bias of the energy absorber 22. Specifically, the releasable connection 24 fixes the seatbelt guide 20 relative to the pillar 14 when the seatbelt retractor 16 is in the unlocked position. The releasable connection 24 releases the seatbelt guide 20 relative to the pillar 14, e.g., by breakage of the releasable connection 24, when force on the webbing 18 exceeds a threshold when the seatbelt retractor 16 is in the locked position.

Specifically, when the retractor 16 is in the unlocked position, the webbing 18 freely extends from and retracts into the retractor 16 and, during this movement of the webbing 18, the webbing 18 moves across the seatbelt guide 20 and the seatbelt guide 20 supports webbing 18. Specifically, the releasable connection 24 fixes the seatbelt guide 20 to the frame 44 and supports the webbing 18 on the frame 44. When the seatbelt retractor 16 is in the locked position, extension of webbing 18 from the retractor 16 is restricted such that force on the webbing 18 is transmitted to the seatbelt guide 20. When the force on the seatbelt guide 20 from the webbing 18 exceeds the load-limiting threshold, e.g., due to forces exerted on the webbing 18 by an occupant during a vehicle impact, the releasable connection 24 releases the seatbelt guide 20 such that the seatbelt guide 20 can move downwardly under the force of the webbing 18 against the bias of the energy absorber 22. This, for example, may limit chest compression by the webbing 18 on the occupant.

The releasable connection 24 fixes the seatbelt guide 20 relative to the pillar 14 in the absence of force that exceeds the load-limiting threshold. Specifically, the releasable connection 24 fixes the seatbelt guide 20 relative to the track 42 in the absence of force that exceeds the load-limiting threshold and the track 42 is fixed relative to the pillar 14. In other words, the seatbelt guide 20, the releasable connect, the frame 44, and the pillar 14 move together as a unit (with the exception of adjustment of the load-limiting assembly 10 to various fixed positions along the pillar 14 as described above).

The releasable connection 24 is frangible relative to one of the vehicle pillar 14 and the seatbelt guide 20. In other words, the releasable connection 24 breaks away from the vehicle pillar 14 and/or the seatbelt guide 20 when subjected to force above the load-limiting threshold. Specifically, in the example shown in the figures, the releasable connection 24 is frangible relative to the track 42. When subjected to force above the load-limiting threshold, the releasable connection 24 separates between the track 42 and the seatbelt guide 20 to allow the seatbelt guide 20 to move relative to the track 42. The load-limiting threshold, for example, may be empirically calculated based on chest compression during vehicle impact. The releasable connection 24 may be designed to release, e.g., to break, at the load-limiting threshold.

The releasable connection 24, for example, may be or may include a weld. In the example shown in the figures, the releasable connection 24 is a tack weld between the rod 56 and the track 42. In such an example, the tack weld is frangible relative to one of the seatbelt guide 20 and the pillar 14, and more specifically, relative to one of the seatbelt guide 20 and the track 42. Specifically, the tack weld is designed to break at the load-limiting threshold (e.g., based on placement, size, material type, etc.). As another example, the releasable connection 24 may be a bracket welded to the rod 56 and the track 42. In other examples, the releasable connection 24 may be a fastener, adhesive, etc.

With reference to FIGS. 2-4, the energy absorber 22 is between the vehicle pillar 14 and the seatbelt guide 20. In other words, in the event the seatbelt guide 20 moves along the track 42 after release of the releasable connection 24, the energy absorber 22 is compressed between the seatbelt guide 20 and the vehicle pillar 14. Specifically, in the example shown in the figures, the energy absorber 22 is between the frame 44 and the seatbelt guide 20. Since the frame 44 is fixed to the pillar 14, the pillar 14, through the frame 44, provides a reaction surface that receives forces from the energy absorber 22. In the example shown in the figures, the energy absorber 22 is supported on the lower plate 46 between the lower plate 46 and the seatbelt guide 20. The energy absorber 22 may be retained to the lower plate 46, e.g., by staking, fastener, adhesive, welding, etc.

The seatbelt guide 20 may be spaced from energy absorber 22 when the releasable connection 24 is connecting the seatbelt guide 20 to the pillar 14. For example, as described above, in the example shown in the figures, the upper plate 48 and the risers 54 are between the energy absorber 22 and the seatbelt guide 20, as shown in the examples in FIGS. 2-8. The energy absorber 22 may abut the upper plate 48. The energy absorber 22 may be free of a connection to the upper plate 48 or may be retained to the upper plate 48, e.g., by staking, fastener, adhesive, welding, etc.

In the example shown in the figures, in the event that force on the webbing 18 transmitted to the releasable connection 24 exceeds the load-limiting threshold, the releasable connection 24 releases the seatbelt guide 20 from the frame 44 and the force of the webbing 18 on the seatbelt guide 20 forces the seatbelt guide 20 downwardly along the slots 50. As the seatbelt guide 20 moves downwardly, the seatbelt guide 20 acts against the bias of the energy absorber 22 to compress the energy absorber 22.

The energy absorber 22 is designed to absorb energy from the seatbelt guide 20 and webbing 18 during downward movement of the seatbelt guide 20 against the bias of the energy absorber 22. The energy absorber 22 may be of any suitable type that absorbs energy from the seatbelt guide 20 during downward movement of the seatbelt guide 20 against the bias of the energy absorber 22.

As set forth above, in the example shown in FIGS. 2-6, the energy absorber 22 is a coil spring 60. The coil spring 60 is loaded by downward movement of the seatbelt guide 20 against the bias of the coil spring 60. The coil spring 60 may be metal or any other suitable material.

Figure 6:
FIG. 6 is a hypothetical graph showing operation of the example of the load-limiting assembly of FIGS. 2-5.

FIG. 6 is a hypothetical representation of the payout of the webbing 18 relative to the force applied by the webbing 18 to the seatbelt guide 20 during and after release of the releasable connection 24 and during compression of the coil spring 60 in the example shown in FIGS. 2-5. As shown in FIG. 6, the webbing 18 is initially paid out a limited amount at the seatbelt guide 20 between the release of the releasable connection 24 and initial compression of the energy absorber 22. The initial payout of the webbing 18 at the seatbelt guide 20 may be a result of downwardly movement of the seatbelt guide 20 relative to the upper plate 48, e.g., in an example in which the risers 54 release the seatbelt guide 20 relative to the upper plate 48 or in the example in which the load-limiting assembly 10 does not include the riser 54. As the seatbelt guide 20 compresses the coil spring 60 against the bias of the coil spring 60, the seatbelt guide 20 continues to move downwardly and pay out a limited amount of webbing 18 at the seatbelt guide 20. When the coil spring 60 is fully compressed, downwardly movement of the seatbelt guide 20 is stopped by the fully-compressed coil spring 60 and the no further payout of webbing 18 occurs from movement of the seatbelt guide 20.

The force required to further load the coil spring 60 increases as the coil spring 60 compresses. Accordingly, the coil spring 60 provides progressive load limiting to the seatbelt guide 20. In the example shown in FIG. 6, the energy absorber 22 has a linear spring constant. In such an example, the load-limiting assembly 10 releases the webbing 18 at a linear rate as increased force is applied to the webbing 18, i.e., webbing 18 is paid out at a constant rate at the seatbelt guide 20 as force on the webbing 18 increases. In other examples, the energy absorber 22 may have a non-linear spring constant.

In the example shown in FIG. 7, the load-limiting assembly 10 may include two springs, i.e., a first spring and a second spring. In the example shown in the FIGS. 7-8, the first spring is the first coil spring 62 and the second spring is the second coil spring 64. The first coil spring 62 abuts both the lower plate 46 and the upper plate 48. The second coil spring 64 abuts one of the lower plate 46 and the upper plate 48 and is spaced from the other of the lower plate 46 and the upper plate 48. In the example shown in FIG. 7, the second coil spring 64 abuts the lower plate 46 and is spaced from the upper plate 48.

The first coil spring 62 and the second coil spring 64 are loaded by downward movement of the seatbelt guide 20 against the bias of the first coil spring 62 and the second coil spring 64. The first coil spring 62 and/or the second coil spring 64 may have a linear spring constant, as shown in the example in FIGS. 7-8. In other examples, the first coil spring 62 and/or the second coil spring 64 may have a non-linear spring constant. The first coil spring 62 and the second coil spring 64 may be metal or any suitable material.

The first spring 62 and a second spring 64 operate in parallel to the first spring 62 to provide progressive load limiting the webbing 18 in the event that force in the webbing 18 transmitted to the releasable connection 24 exceeds the load-limiting threshold. Specifically, the second spring 64 is shorter than the first spring 62. In the example shown in the figures, an upper end of the first spring 62 is above an upper end of the second spring 64. In other words, the upper end of the first spring 62 is nearer the seatbelt guide 20 than the upper end of the second spring 64 such that the energy absorber 22 is partially loaded by downward movement of the seatbelt guide 20 before the second spring 64 is loaded by downward movement of the seatbelt guide 20. In other words, and compression of the second spring 64 is initiated only after compression of the first spring 62. After initiation of compression of the second spring 64, the seatbelt guide 20 concurrently loads the first spring 62 and the second spring 64 as the seatbelt guide 20 continues to move downwardly.

In the example shown in FIG. 7, the first spring 62 and the second spring 64 provide progressive load-limiting. In the example shown in FIG. 7, the first spring 62 and the second spring 64 each have a linear spring constant. The spring constant of the first spring 62 may be the same as or different than the spring constant of the second spring 64. In the example shown in FIG. 7, the first spring 62 and the second spring 64 are coaxial.

In the example shown in FIG. 7, as the first spring 62 is loaded, webbing 18 is paid out at the seatbelt guide 20 at a constant rate during compression of the first spring 62 before initiation of compression of the second spring 64. FIG. 8 is a hypothetical representation of the payout of the webbing 18 relative to the force applied by the webbing 18 to the seatbelt guide 20 during and after release of the releasable connection 24 for the example in FIG. 7. As the seatbelt guide 20 compresses the first spring 62 to the point at which compression of the second spring 64 is initiated, the webbing 18 is paid out at the seatbelt guide 20 at a constant rate during the simultaneous compression of both the first spring 62 and the second spring 64. The rate at which the webbing 18 is paid out at the seatbelt guide 20 relative to force on the webbing 18 is decreased upon initiation of compression of the second spring 64, i.e., the combination of the first spring 62 and the second spring 64 increases force required to move the seatbelt guide 20 downwardly against the combined bias of the first spring 62 and the second spring 64. The load-limiting assembly 10 progressively increases resistance to downward movement of the seatbelt guide 20 during the stage at which the first spring 62 is compressed prior to compression of the second spring 64 and the load-limiting assembly 10 progressively increases resistance to downward movement of the seatbelt guide 20 during the stage at which both the first spring 62 and the second spring 64 are simultaneously compressed.

In the example shown in FIG. 9-13, load-limiting assembly 10 may include a polymeric block 66. The polymeric block 66 is loaded by downward movement of the seatbelt guide 20 against the bias of the polymeric block 66. The polymeric block 66 may be various types of rubber and/or foam. As an example, the polymeric block 66 may be polyurethane.

The polymeric block 66 may include more than one segments stacked in series between the seatbelt guide 20 and the pillar 14, specifically between the seatbelt guide 20 and the frame 44. In such an example, the segments operate together to provide progressive load-limiting, as shown in FIG. 14. The segments may be fixed to each other, e.g., by adhesive, staking, etc. In the example shown in FIGS. 9-12, the polymeric block 66 includes a first segment 68 and a second segment 70. In such an example, the second segment 70 is supported on the frame 44, e.g., the lower plate 46, and the first segment 68 is supported on the second segment 70. The second segment 70 may be fixed to the frame 44, e.g., the lower plate 46, for example by adhesive, staking, etc.

In the example shown in the figures, the first segment 68 is between second segment 70 and the seatbelt guide 20. When the seatbelt guide 20 moves downwardly along the track 42, the seatbelt guide 20 loads the first segment 68 prior to loading the second segment 70. The first segment 68 may be compressible relative to the second segment 70. In other words, the first segment 68 is designed to (i.e., sized, shaped, material type) to compress under a lower load than the load to compress the second segment 70. The first segment 68 is sized, shaped, and/or of material type to have a first deformation threshold at which the first segment 68 deforms. The second segment 70 is sized, shaped, and/or of material type to have a second deformation threshold at which the second segment 70 deforms. The second deformation threshold is higher than the first deformation threshold.

Figure 12:
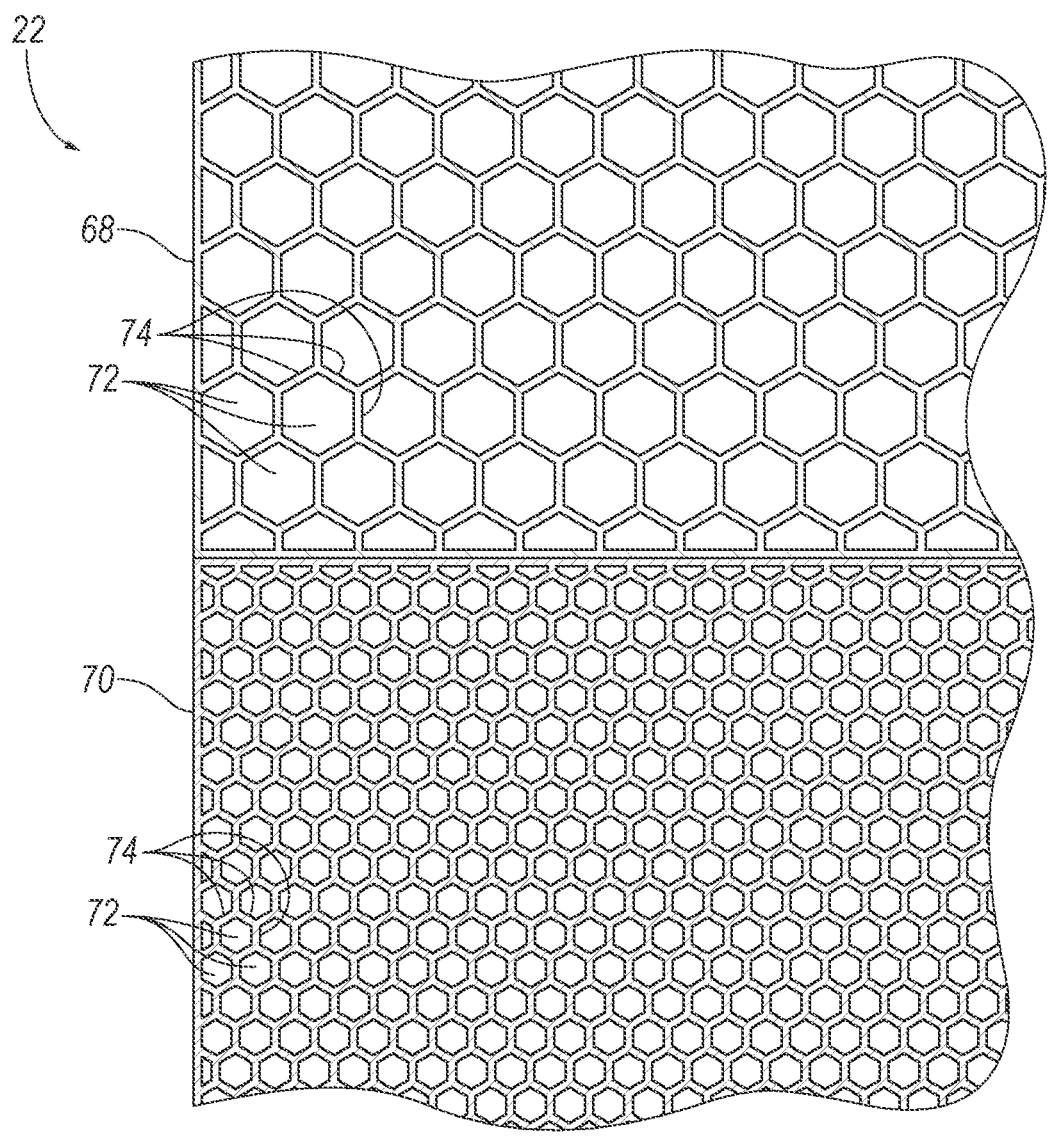
FIG. 12 is a cross-section of the energy absorber along line 12 in FIG. 10.

With reference to FIG. 12, the polymeric block may have a honeycomb configuration. Specifically, the first segment 68 and the second segment 70 may each have a honeycomb configuration. The honeycomb configuration has open cells (i.e., filled with air) defined by walls. In such an example, the cells are hexagonal prisms. In other words, the walls of the cell may have a hexagonal prismatic shape. The honeycomb configuration, e.g., the thickness and length of the wall, may be different for the first segment 60 and the second segment 70 to define, at least in part, the variation between the first deformation threshold and the second deformation threshold.

In the example shown in FIGS. 9-13, the first segment 68 and the second segment 70 provide progressive load-limiting. In the example shown in FIGS. 9-13, the first segment 68 and the second segment 70 each have linear deformation versus load.

Figure 13:
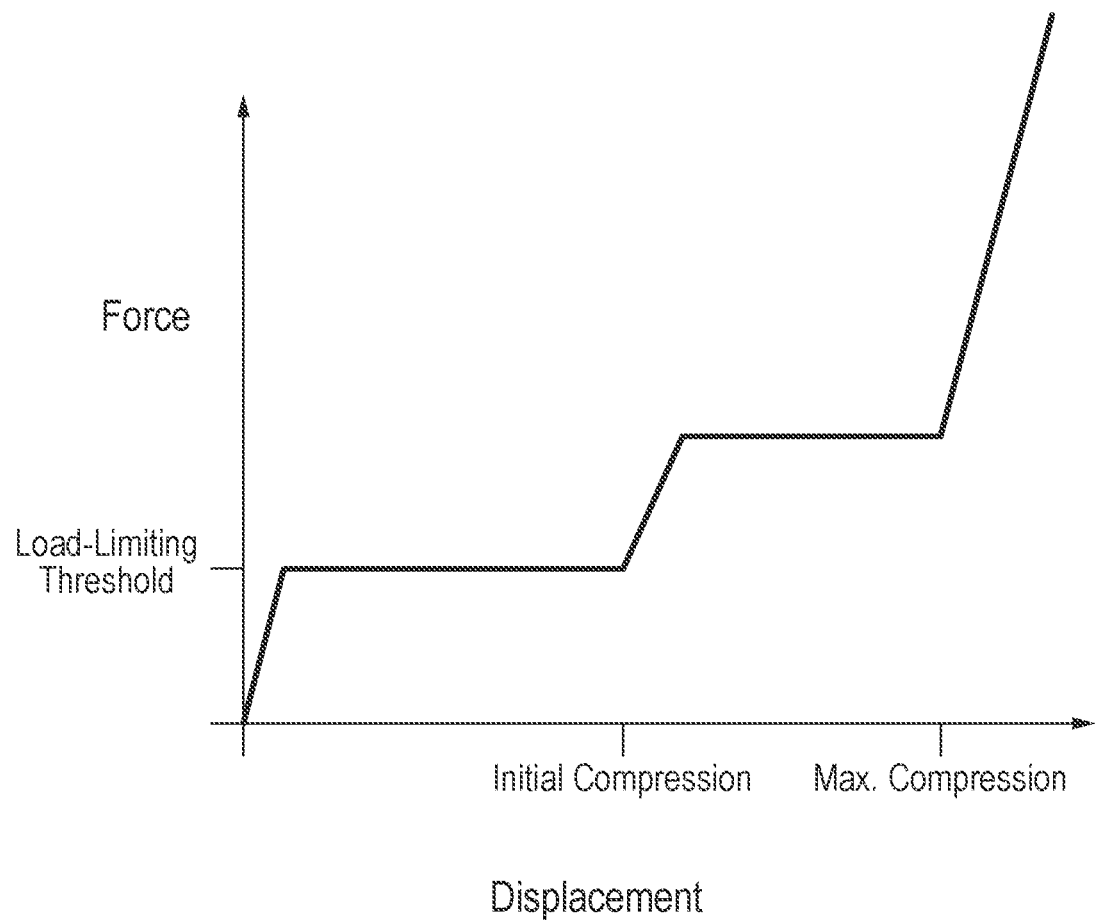
FIG. 13 is a hypothetical graph showing operation of the example of the load-limiting assembly of FIG. 9.

FIG. 13 is a hypothetical representation of the payout of the webbing 18 relative to the force applied by the webbing 18 to the seatbelt guide 20 during and after release of the releasable connection 24 for the example in FIGS. 9-12. In the example shown in FIGS. 9-13, as the first segment 68 is loaded, webbing 18 is paid out at the seatbelt guide 20 at a constant rate during compression of the first segment 68 before initiation of compression of the second segment 70. As the seatbelt guide 20 compresses the first segment 68 to the point at which compression of the second segment 70 is initiated, the webbing 18 is paid out at the seatbelt guide 20 at a constant rate during the simultaneous compression of both the first segment 68 and the second segment 70. The rate at which the webbing 18 is paid out at the seatbelt guide 20 relative to force on the webbing 18 is decreased upon initiation of compression of the second segment 70, i.e., the combination of the first segment 68 and the second segment 70 increases force required to move the seatbelt guide 20 downwardly against the combined bias of the first segment 68 and the second segment 70. The load-limiting assembly 10 progressively increases resistance to downward movement of the seatbelt guide 20 during the stage at which the first segment 68 is compressed prior to compression of the second segment 70 and the load-limiting assembly 10 progressively increases resistance to downward movement of the seatbelt guide 20 during the stage at which both the first segment 68 and the second segment 70 are simultaneously compressed.

This disclosure has been described in an illustrative manner, and it is to be understood that the terminology which has been used is intended to be in the nature of words of description rather than of limitation. Many modifications and variations of the present disclosure are possible in light of the above teachings, and the disclosure may be practiced otherwise than as specifically described.

The invention claimed is:

1. An assembly comprising:
a vehicle pillar elongated along an axis;
a seatbelt retractor and a webbing retractably extendable from the retractor, the seatbelt retractor being lockable from an unlocked position in which the webbing is extendable from and retractable into the retractor to a locked position in which the retractor restricts extension of the webbing from the retractor;
a seatbelt guide supported by the pillar;
the seatbelt retractor being below the seatbelt guide, the webbing extending upwardly from the seatbelt retractor around the seatbelt guide;
a releasable connection fixing the seatbelt guide relative to the pillar when the seatbelt retractor is in the unlocked position and releasing the seatbelt guide relative to the pillar when force on the webbing exceeds a threshold when the seatbelt retractor is in the locked position; and
an energy absorber between the vehicle pillar and the seatbelt guide.

2. The assembly as set forth in claim 1, wherein the releasable connection is frangible relative to one of the vehicle pillar and the seatbelt guide.

3. The assembly as set forth in claim 1, wherein the releasable connection is a weld that is frangible relative to one of the vehicle pillar and the seatbelt guide.

4. The assembly as set forth in claim 1, wherein the seatbelt guide includes a rod and the webbing is supported by the rod, the releasable connection connecting the rod to the pillar.

5. The assembly as set forth in claim 1, wherein the seatbelt guide includes a rod and a sleeve rotatably supported on the rod, the webbing being supported by the sleeve and the releasable connection fixing the rod relative to the pillar.

6. The assembly as set forth in claim 1, further comprising a track fixed relative to the pillar and elongated along the axis, the seatbelt guide being moveably engaged with the track.

7. The assembly as set forth in claim 6, wherein the releasable connection fixes the seatbelt guide to the track.

8. The assembly as set forth in claim 1, further comprising a track fixed relative to the pillar, the track including a slot elongated along the axis, the seatbelt guide being moveably engaged with the slot.

9. The assembly as set forth in claim 1, further comprising a lower plate fixed to the pillar, the energy absorber being supported on the lower plate between the lower plate and the seatbelt guide.

10. The assembly as set forth in claim 9, wherein the retractor is below the lower plate.

11. The assembly as set forth in claim 9, further comprising a track above the lower plate and fixed relative to the pillar, the seatbelt guide being moveably engaged with the track.

12. The assembly as set forth in claim 1, wherein the seatbelt retractor is fixed to the vehicle pillar.

13. The assembly as set forth in claim 1, wherein the energy absorber is a coil spring.

14. The assembly as set forth in claim 1, wherein the energy absorber includes a polymeric block.

15. The assembly as set forth in claim 14, wherein the polymeric block has a honeycomb configuration.

16. An assembly comprising:
a frame including a track elongated along an axis;
a seatbelt retractor and a webbing retractably extendable from the retractor, the seatbelt retractor being lockable from an unlocked position in which the webbing is extendable from and retractable into the retractor to a locked position in which the retractor restricts extension of the webbing from the retractor;
a seatbelt guide supported by the frame, the webbing extending from the seatbelt retractor around the seatbelt guide;
a releasable connection fixing the seatbelt guide relative to the frame when the seatbelt retractor is in the unlocked position and releasing the seatbelt guide relative to the frame when force on the webbing exceeds a threshold when the seatbelt retractor is in the locked position; and
an energy absorber between the frame and the seatbelt guide.

17. The assembly as set forth in claim 16, wherein the releasable connection is frangible relative to one of the frame and the seatbelt guide.

18. The assembly as set forth in claim 16, wherein the seatbelt guide includes a rod and the webbing is supported by the rod, the releasable connection fixing the rod to the frame.

19. The assembly as set forth in claim 16, wherein the frame includes a lower plate, the energy absorber being supported on the lower plate between the lower plate and the seatbelt guide.

20. The assembly as set forth in claim 19, further comprising an upper plate supported by the frame between the seatbelt guide and the energy absorber.

\* \* \* \* \*